(12) United States Patent
Benecke

(10) Patent No.: US 7,231,759 B2
(45) Date of Patent: Jun. 19, 2007

(54) LINK CHAIN

(75) Inventor: Rainer Benecke, Dortmund (DE)

(73) Assignee: J.D. Theile GmbH & Co. KG, Schwerte (DE)

( * ) Notice: Subject to any disclaimer, the term of this patent is extended or adjusted under 35 U.S.C. 154(b) by 334 days.

(21) Appl. No.: 10/967,544

(22) Filed: Oct. 18, 2004

(65) Prior Publication Data
US 2005/0113198 A1    May 26, 2005

(30) Foreign Application Priority Data
Oct. 18, 2003   (DE) ............................. 103 48 491

(51) Int. Cl.
*F16H 7/06* (2006.01)
*F16G 13/02* (2006.01)
*F16G 13/18* (2006.01)

(52) U.S. Cl. ............................. 59/78; 59/84; 474/206
(58) Field of Classification Search ............... 59/78, 59/84, 90, 80; 474/155, 164, 206
See application file for complete search history.

(56) References Cited

U.S. PATENT DOCUMENTS

| | | | | |
|---|---|---|---|---|
| 3,410,085 | A | * | 11/1968 | Sheth ............................. 59/84 |
| 4,110,971 | A | | 9/1978 | Bruce |
| 4,497,169 | A | * | 2/1985 | Millington ..................... 59/84 |
| 4,627,232 | A | * | 12/1986 | Bruce ............................. 59/84 |
| 6,679,648 | B2 | | 1/2004 | Benecke |
| 6,925,794 | B2 | * | 8/2005 | Dalferth et al. ................. 59/78 |
| 7,065,952 | B2 | | 6/2006 | Benecke |
| 7,107,754 | B2 | * | 9/2006 | Sinz et al. ..................... 59/78 |

FOREIGN PATENT DOCUMENTS

| | | |
|---|---|---|
| DE | 3433715 A1 | 4/1985 |
| DE | 3243355 C2 | 7/1985 |
| DE | 32 34137 C3 | 11/1986 |
| DE | 3615734 A1 | 11/1987 |

(Continued)

OTHER PUBLICATIONS

Search report for corresponding Great Britain application dated Aug. 16, 2006.

*Primary Examiner*—David B. Jones
(74) *Attorney, Agent, or Firm*—Margaret Polson; Patent Law Offices of Rick Martin, PC

(57) ABSTRACT

A chain 1 with individual links 2, 3, inserted one into the other, of which at least every second link is formed as a flat link 3. When the flat link 3 has a vertical orientation in the shank region 6, 7 connecting the curvatures 4, 5, the flat link has a smaller maximum diameter H in the vertical direction than in the horizontal direction L. The vertical diameter H of a shank 6, 7 being smaller than the diameter the flat link 3 in the curvatures 4, 5, such that the flat chain links 3 have a ratio of its cross sectional area in the shank region 6, 7 to the cross section area in the central regions 8 of the curvatures 4, 5 is greater than 0.55 and smaller than 0.85. The plane of the horizontal maximum diameter L in the shank region 6, 7 is disposed off-center and offset with respect to the outside of the particular shanks 6, 7.

16 Claims, 3 Drawing Sheets

FOREIGN PATENT DOCUMENTS

| | | |
|---|---|---|
| DE | 39 29148 A1 | 1/1991 |
| DE | 197 01 579 A1 | 6/1998 |
| DE | 197 24 586 C1 | 11/1998 |
| FR | 1041883 A | 10/1953 |
| GB | 693734 | 8/1951 |
| GB | 1467445 | 3/1977 |
| GB | 2127127 A | 4/1984 |
| GB | 2326145 A | 12/1998 |

* cited by examiner

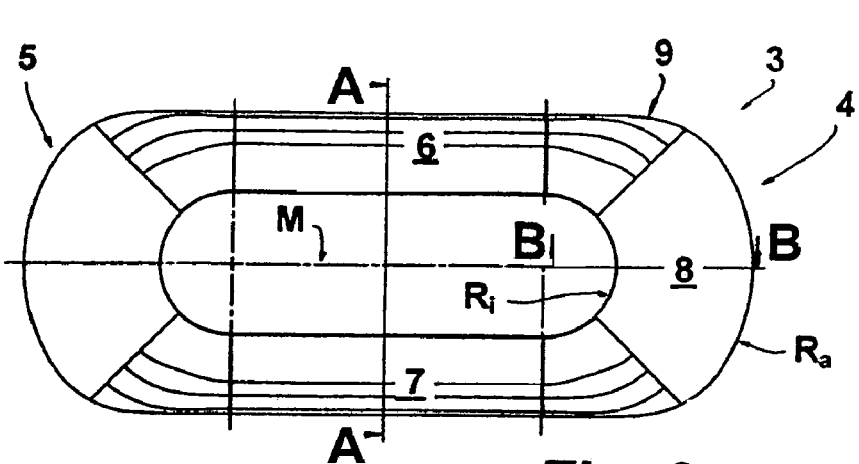
Fig. 3
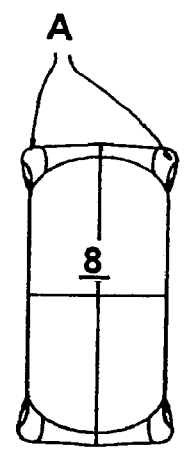
Fig. 4a
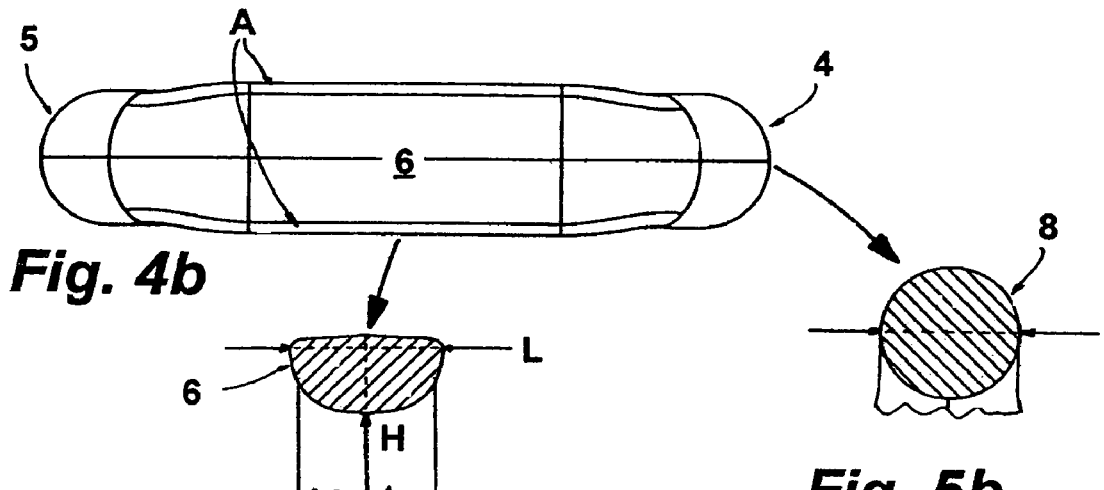
Fig. 4b
Fig. 5a
Fig. 5b
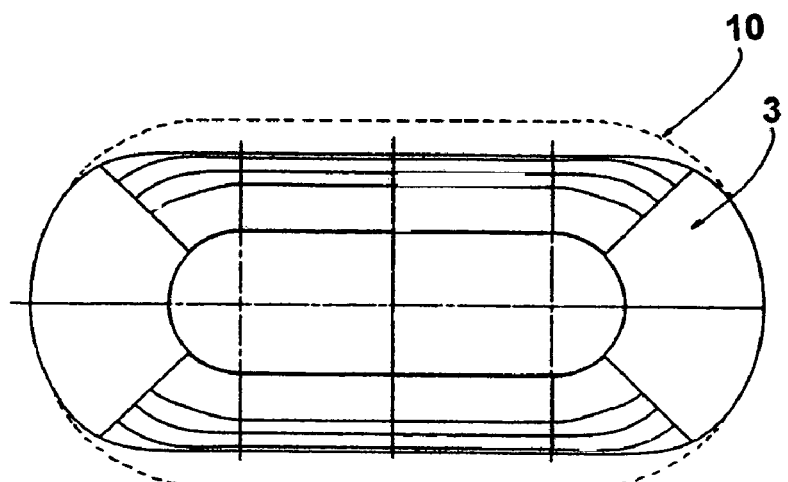
Fig. 6

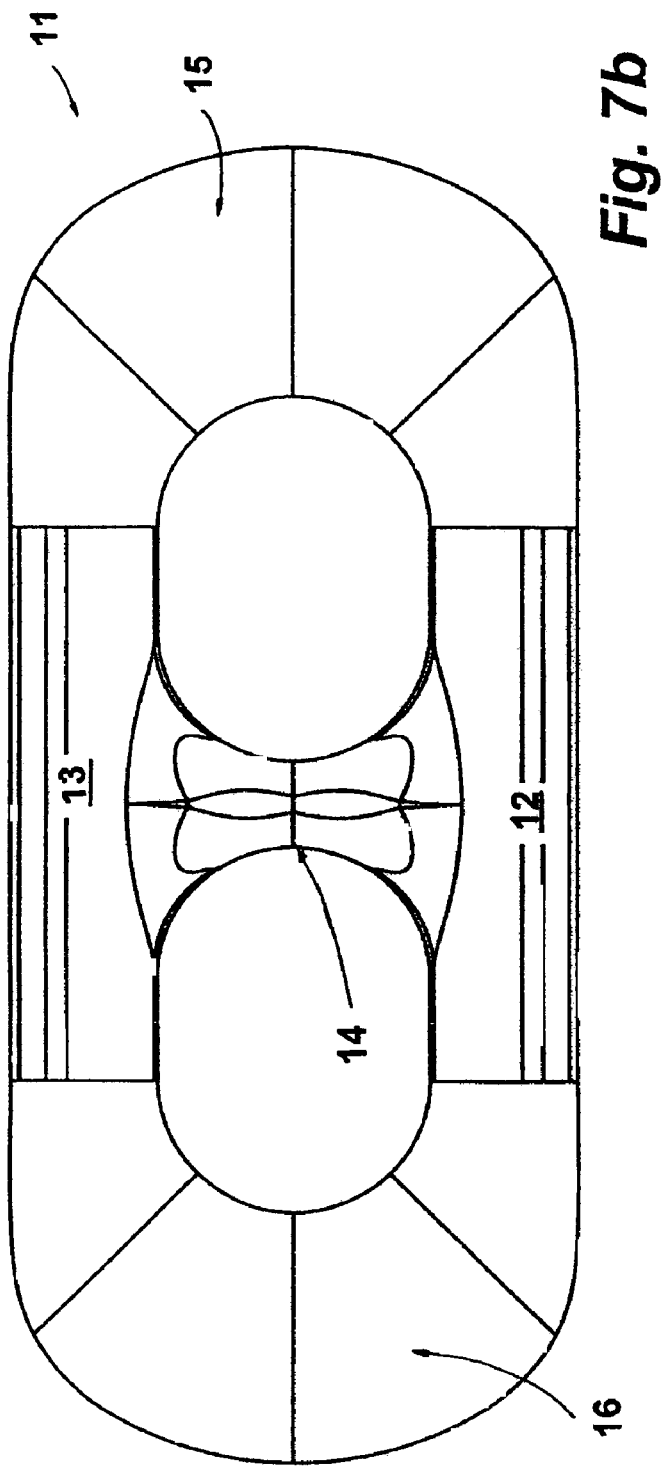
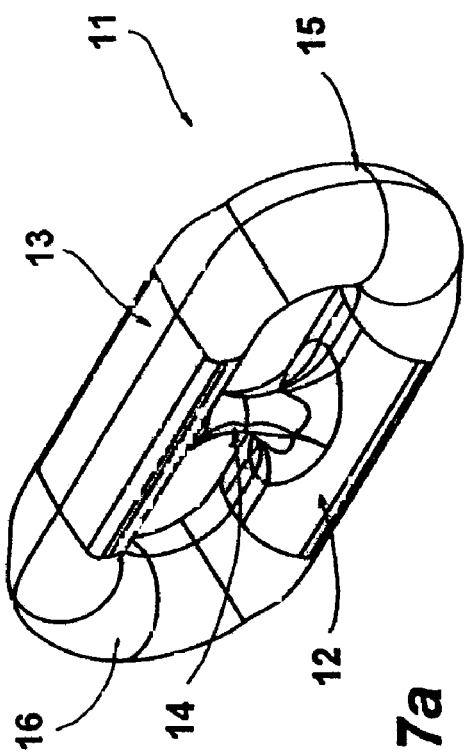
Fig. 7b
Fig. 7a

LINK CHAIN

CROSS REFERENCE APPLICATIONS

This application claims priority from German application no. 103 48 491.4-12 filed Oct. 18, 2003.

FIELD OF INVENTION

The invention relates to a chain with individual links inserted into one and other. In the chain at least every second link is a flat link. The flat link has shank regions connecting the curvature portions. When the flat link is oriented vertically, the shank region has a lesser maximum diameter in the vertical direction than in the horizontal direction and the vertical diameter of a shank is less than the diameter of the link in the curvature region.

BACKGROUND OF THE INVENTION

Chains are employed as conveyor chains for operating scraper conveyors in underground coal mining. A scraper conveyor or scraper chain conveyor can have two rotating motor-driven conveyor chains with scrapers secured between the chains, connecting them. In appropriate applications such conveyor chains can also be arranged in a scraper chain conveyor as a center chain, in particular as a double center chain. During operation the scraper conveyor chains are drawn over a conveyor trough such that the excavated material, such as coal, is conveyed through the scraper and is carried away and transported.

The conveyor chains of such scraper conveyors were originally formed of uniform round links inserted into one and other. As more powerful drive units are used, there is a need for higher loading capacity chains employed as conveyor chains. To meet these demands larger diameter links, with a consequentially greater cross sectional area, are utilized in the prior art. However, the use of links with larger material diameter necessitates that the links, and therefore the chains, have a greater outer width.

While there are generally no disadvantages to this with chains used in horizontal applications, an increase of the material diameter the links in chains used vertical applications leads to an increase of the height of the scraper conveyor. Due to the frequently cramped spatial conditions in underground coal mining, especially when mining lodes of narrow thickness, it is desirable to keep the height of a scraper conveyor as low as possible. For this reason conveyor chains, also called flat chains, have been developed.

When vertical the shanks connecting the curvatures of flat chains have a diameter greater in the horizontal direction and smaller in the vertical direction compared to the cross sectional axes in the region of the curvatures. Consequently, the shanks of such links have a compressed, flattened cross section compared to the round cross section of the curvatures. Such conveyor chains serving as link chains are disclosed in DE 32 34 137 C2 or DE 197 24 586 C1.

In prior art flat chains, the primary consideration is not to reduce the cross sectional area of the flat chain links despite the flattening. Deviations of approximately 5 to 8% caused by the change of the cross sectional form of the shanks of the flat chain links are accepted as a necessity. In the prior art the aim was to minimize the reduction of the cross sectional area for the shanks compared to the curvatures, or to prevent any reduction. The problem is that any excessive reduction of the cross sectional area of the shanks would run counter to the expected increase of loading capacity of such a chain caused by the increase of the material diameter overall.

Nevertheless, against the described background there is the need for conveyor chains that have high tensile load capacity and a low structural height of their vertically oriented links. Put another way, there is a need for a conveyor chain in which the height of the vertically oriented links is lowered without loosing tensile load capacity. With increased tensile load capacity larger tonnages can be conveyed and/or conveying distances can be increased.

The present invention addresses the problem of further developing an above cited chain according to the species, in particular for use as a conveyor chain in underground coal mining, such that it meets the above listed aims.

SUMMARY OF THE INVENTION

The primary aspect of the present invention is to provide a chain in which the vertical height is reduced with minimal or no loss of tensile load capacity.

Other aspects of this invention will appear from the following description and appended claims, reference being made to the accompanying drawings forming a part of this specification wherein like reference characters designate corresponding parts in the several views.

In the present invention flat links have a ratio of the cross sectional area in the region of the shanks to the cross sectional area in the central regions of the curvatures which is greater than 0.55 and less than 0.85. Also the plane of the maximum diameter horizontal in the shank region is off-center and offset with respect to the outside of the particular shank.

In this link the cross sectional area of the shank compared with the curvature regions is reduced as compared to conventional chains with flat links that have identical cross sectional area in the curvature regions. The described properties occur in flat links with and without fillet. In flat links with a fillet, the reduced cross sectional area shank region is located between the fillet and the curvatures.

By minimizing the cross sectional area in the shank region the maximum height of the link, and therefore the chain, is correspondingly reduced. This makes the present invention especially suitable for use as a conveyor chain for operating scraper conveyors.

Interestingly and unexpectedly, it has been found that the flat links of the present invention with a reduced cross sectional area in the shank region have a higher breaking strength than known flat links. Viewed conversely, starting at constant height of the flat links, the tensile load capacity can be increased when a material thickening takes place exclusively in the region of the curvatures of the flat chain links. These findings were unexpected, since in published prior art increasing the breaking strength was accomplish by increasing the material diameter, and consequently the cross sectional area, in the entire link.

Compared with chains of identical diameter, the present invention has not only an increase tensile load capacity in the region of the curvatures and a reduction of the vertical height of the link corresponding to the shank reduction, but also the decrease of the cross sectional area of the shanks results in these links having a lower weight. Even if the savings in weight in a single flat link is not great compared to known links, with the increasing length of such conveyor chains, the weight savings add up and result in a not inconsiderably reduction. Consequently, at constant conveying distance and drive, a correspondingly larger quantity can be moved than has been the case with flat chains of identical curvature dimensions in the known prior art chains.

To prevent the jamming of this chain and to increase the movability, the shanks of the flat links are rounded off toward the inside direction. The plane of the horizontal maximum diameter of the shank is off-center and offset with respect to the outside of the link or of the shank. The cross sectional shape of the shank is therefore approximately a semicircle, the curvature being disposed such that it is directed toward the inside.

In such a chain the cross sectional area ratio of its flat links is preferably between 0.6 and 0.7, in particular in the range of 0.64 to 0.69.

In a preferred embodiment the curvatures of the flat link connecting the shanks have an identical cross sectional shape and cross sectional area in an arc extending over 75 to 100 degrees and an arc segment disposed mirror symmetrically to the central longitudinal plane of such a link. According to an especially preferred embodiment, this arc segment extends over approximately 90 degrees. The cross sectional shape of this arc segment is usefully circular. However, it can also assume elliptical shapes. In such an implementation of the curvatures the further links inserted in the chain can pivot as intended and during this pivoting a surface pressure identical over the arc segment is given between the adjacent links in contact with one another. The further links can be either round links or flat links.

A further increase of the breaking strength under the application of a tensile force can be attained when the outbulging, defined by the maximum diameter of the shanks, extends up into the region of the curvatures and usefully where only a short transitional arc portion adjoins the arc segment of constant cross sectional shape and cross sectional area of the curvatures.

The inner radius of the curvatures of the link is constant. In contrast, the outer radius of the curvature is not constant. In the proximity of the arc segment of the curvatures with constant cross sectional shape and area the outer radius is also preferably constant. In a transitional segment adjoining the outer radius, in contrast, is markedly smaller, continuous transitions being provided into the arc segment with constant cross sectional shape and area and into the shank with its outbulging.

The breaking strength of a 48 flat chain according to known prior art is approximately 2,900 to 3,200 kN. With a flat chain according to this invention with a vertical height of the flat chain links identical to the 48 flat chain of prior art, and with a correspondingly stronger concept of the curvatures with a diameter of 56 mm, has a breaking strength of more than 4,300 kN.

In the described chain only every second chain link is formed as a flat link. It is nevertheless possible to provide such a chain, which consists exclusively of flat links.

The above description of a flat link refers not only to a closed flat link, but also to the implementation of a lock, which accordingly has an outer and an inner contour corresponding to those of the remaining flat links. Such a lock for the link chain will be employed if all links are developed as flat links. The lock developed as a flat link is usefully a horizontally disposed chain link within the link chain.

BRIEF DESCRIPTION OF THE DRAWINGS

FIG. 3 is a side view of the flat link of FIG. 2.

FIG. 4a, 4b are a end-on view and a top view onto the link of FIG. 2

FIG. 5a, 5b are cross-sections through the link of FIG. 3 along the section lines A—A and B—B of FIG. 3, FIG. 6 is a comparison representation of the link of FIG. 3 with a link of prior art of identical diameter.

FIG. 7a, 7b are representations of a further flat link.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

A conveyor chain 1 for use in underground coal mining as a part of a scraper conveyor is developed as a flat chain and comprises horizontally oriented links 2 alternating with vertically oriented flat links 3. The links 2 are round wire links which are welded together after insertion into two flat links 3. The flat links 3 are produced by forging.

Figure 1:
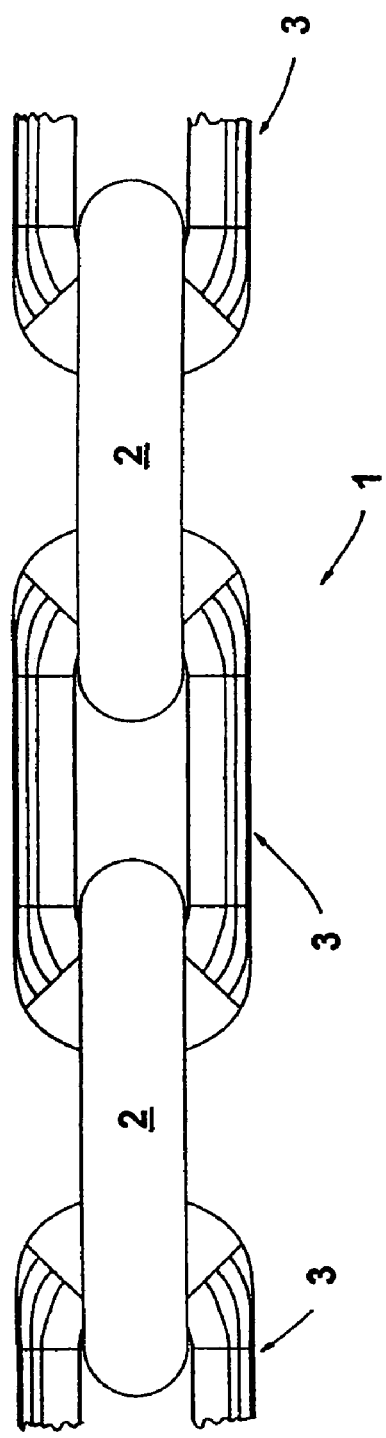
FIG. 1 is a side view of a segment of a flat chain employed as a conveyor chain for underground coal mining.
Figure 2:
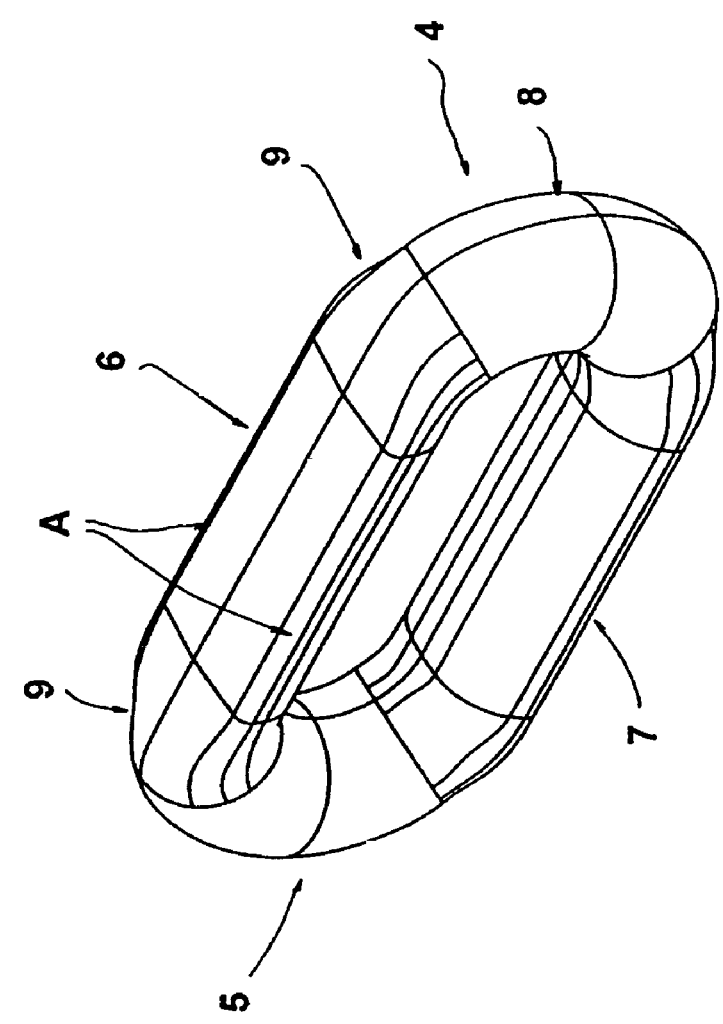
FIG. 2 is a perspective view of an isolated link of the conveyor chain of FIG. 1.

A flat link 3 of the conveyor chain 1 is depicted as an isolated link in FIG. 2 in perspective view. The flat link 3 has curvature portions 4, 5, which connect two shanks 6, 7 with each other. Each curvature 4, 5 has an arc segment 8, which in the depicted embodiment example has a constant circular cross sectional shape and constant diameter. Therefore, in the arc segment 8 of the curvatures 4, 5 the cross sectional area is constant.

As shown in FIG. 3, starting from the central longitudinal plane M the arc segment 8 extends over 45 degrees toward the adjoining shank 6 or 7. Shanks 6, 7 are approximately semicircular in cross section as shown in FIG. 5a. The axis of the maximum diameter L in the horizontal direction is eccentric and offset with respect to the outside of the shank 6 and is disposed only slightly below the outer edge of shank 6. As seen in FIG. 5a, the maximum diameter L of shanks 6, 7 in the horizontal extent is greater than the maximum diameter H of shanks 6, 7 in the vertical direction.

The maximum diameter L of shanks 6, 7 is greater than in the region of arc segment 8 in curvature 4 or 5. The maximum vertical diameter H of a shank 6, 7, in contrast, is smaller than the diameter in the region of arc segment 8 of curvature 4, 5. Due to this configuration, the shanks 6, 7 have an outbulging A extending in the horizontal direction compared to curvatures 4, 5, which is particularly apparent in the views of FIGS. 4a and 4b. As is evident in FIGS. 5a and 5b, the side facing into the space enclosed by the flat chain links 3 is rounded in order to permit good pivoting and to prevent jamming.

An essential element in the flat link 3 is that the cross sectional area in the region of the shanks 6, 7 is reduced relative to the cross sectional area in the region of the arc segments 8 of curvatures 4, 5. In the depicted embodiment example the cross sectional area of shanks 6, 7 is reduced by a factor of 0.68 compared to the cross sectional area of the arc segments. The diameter of the flat link 3 depicted in the Figures is 57.2 mm in its arc segments 8. Consequently, the cross sectional area in area of the flat link is 2,570 mm$^2$. In contrast, in the shanks 6, 7 the cross sectional area is only 1,770 mm$^2$ due to the above described geometry and configuration.

The outbulgings A of shanks 6, 7 extend toward the arc segments 8 of curvatures 4, 5 up into a transitional arc segment 9. Only in the transitional segment 9 extending over 45 degrees do the outbulgings A of shanks 6, 7 transition over into the arc segment 8. In a preferred implementation, this transition takes place on the shortest possible path, such that the outbulgings A with their horizontal maximum diameter L extend as far as possible into the transitional arc segment 9.

The inner radius $R_i$ of the flat link 2 is constant in the region of the curvatures 4, 5. The outer radius $R_a$ of the flat link 3 is in principle constant in the region of arc segments 8, while it is smaller in the transitional arc segment in order to guide it toward the outside of shanks 6, 7. Nevertheless, it is possible to provide already a lesser outer radius in the outer regions of arc segment 8.

As a consequence of the geometry of the flat link 3, described above and depicted in the Figures, the conveyor chain 1 in operation can pivot unhindered without tension peaks being induced in the flat chain link 3, particularly when guided about a drive wheel whose teeth engage about the chain links 2. Due to the relatively small outbulging A in the horizontal direction, jamming is prevented if the conveyor chain 1 is operated according to specification.

In the Figures a conveyor chain 1 has been described in which the links 2, 3 have the same portioning. It is understood that with the flat links 3 a chain can also be formed whose links have a different portioning. For example, the flat links can have a smaller portioning than the horizontal links.

The breaking strength of the conveyor chain 1 is approximately 4,300 kN. The height of the flat links 3 (diameter in the region of the arc segments 8 of curvatures 4, 5: 56 mm) corresponds to the height of conventional flat links of prior art 48 flat chain.

FIG. 6 depicts in side view the flat link 3 in comparison to a flat link 10 according to known prior art at the same diameter in the region of curvatures 4, 5. This comparison makes clear that the height of the flat links 3 is markedly less than the height of conventional flat links 10 of the same material diameter.

The improved properties described for the flat link 3 result even if this chain link has a fillet connecting the two shanks 6, 7.

FIG. 7a shows in perspective view a further flat link 11 for a conveyor chain. The flat link 11 is fundamentally structured like the above described flat link 3 of conveyor chain 1. The difference is that the flat link 11 includes a fillet 14 connecting the two shanks 12, 13. The curvatures 15, 16 of this flat link 11 are conceptualized in the same way as in the flat link 3. The shank region of 12, 13, with the cross sectional area reduced compared to the curvatures 15, 16, is located in the flat chain link 11 between curvatures 15, 16 and the fillet 14, as is evident in the side view of the flat chain link 11 of FIG. 7b.

The invention is described in conjunction with a conveyor chain 1 used in underground coal mining. Yet the described advantages also occur in other tension-loaded chains, independently of the application purpose that they serve. Even if in other application fields the height of the vertically oriented flat c links probably play only a subordinate role, chains for other applications can also profit from the advantages of a greater breaking load capacity and the lower weight. In other applications that chains are utilized each chain link can be formed as a flat chain link, as previously described.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

LIST OF REFERENCE SYMBOLS

1 Conveyor chain
2 link
3 Flat link
4 Curvature
5 Curvature
6 Shank
7 Shank
8 Arc segment
9 Transitional arc segment
10 Flat link
11 Flat link
12 Shank
13 Shank
14 Fillet
15 Curvature
16 Curvature
A Outbulging
L Maximum diameter, horizontal
H Maximum diameter, vertical
M Central longitudinal plane
$R_a$ Outer radius
$R_i$ Inner radius

I claim:

1. A chain with individual links comprising:
   the links being inserted into the other;
   at least every second link being formed as a flat link;
   the flat link having shanks connecting curvature portions;
   the curvatures portions being continuously curved in an inner region of the curvature;
   when the shanks are in a vertical orientation the shanks have a smaller maximum diameter in a vertical direction than in a horizontal direction;
   the vertical diameter of the link in the shank being smaller than the diameter the link in the region of the curvature portions;
   whereby the flat links are formed such that a ratio of a cross sectional area in the shank region to a cross sectional area in central regions of the curvatures is greater than 0.55 and less than 0.85.

2. The chain as claimed in claim 1, wherein the cross sectional ratio is between 0.6 and 0.7.

3. The chain as claimed in claim 1 or 2, wherein the curvature portions of the flat links each have an arc segment extending over 80 to 100 degrees which have a constant cross sectional shape and cross sectional area.

4. The chain as claimed in claim 3, wherein the cross sectional shape of the arc segments is circular.

5. The chain as claimed in claim 3, wherein the cross sectional shape of the arc segments is elliptical.

6. The chain as claimed in claim 1 or 2, wherein the curvature portions of the flat links each have an arc segment extending over 80 to 100 degrees which have a constant cross sectional area and the cross sectional shape of the arc segments with constant cross sectional area transitions from a circular cross sectional shape in the direction toward the shanks into an elliptical cross sectional shape.

7. The chain as claimed in one of claims 1 or 2, wherein the shanks have a cross sectional shape approximating a semicircle.

8. The chain as claimed in one of claim 3, further comprising:
an outbulging defined by the horizontal maximum diameter of shanks relative to the curvatures extending up into a transitional arc segment adjoining the arc segment of constant cross sectional shape and cross sectional area.

9. The chain as claimed in claim 4 wherein:
an inner radius of the flat links is enclosed by the curvatures and is constant over the entire arc described by these curvatures;
an outer radius in the region of the arc segment is constant with respect to its cross sectional shape and cross sectional area and has a constant outer radius, which is adjoined toward the shanks by a transitional arc segment
each transitional arc segment with a markedly smaller outer radius with transitions to the adjoining shank and said arc segment.

10. The chain as claimed in claim 8 wherein:
an inner radius of the flat links is enclosed by the curvatures and is constant over the entire arc described by these curvatures;
an outer radius in the region of the arc segment is constant with respect to its cross sectional shape and cross sectional area and has a constant outer radius, which is adjoined toward the shanks by a transitional arc segment
each transitional arc segment with a markedly smaller outer radius with transitions to the adjoining shank and said arc segment.

11. The chain as claimed in one of claims 1 to 2, wherein the ratio of the height of the flat links to the diameter of the curvatures is in the range between 2.4 and 2.1.

12. The chain as claimed in claim 11, wherein the ration of height of the flat links to the diameter of the curvatures is in the range between 2.3 and 2.25.

13. The chain as claimed in claim 8, wherein the ratio of the height of the flat links to the diameter of the curvatures is in the range between 2.4 and 2.1.

14. The chain as claimed in claim 13, wherein the ration of height of the flat links to the diameter of the curvatures is in the range between 2.3 and 2.25.

15. The chain as claimed in one of claims 1 to 2, wherein the chain is a conveyor chain of a scraper conveyor.

16. The chain as claimed in one of claims 1 to 2, wherein one of the flat links is developed as a lock, whose outer and inner contour corresponds to that of the remaining flat links.

* * * * *